(12) United States Patent
Williams et al.

(10) Patent No.: US 6,296,730 B1
(45) Date of Patent: Oct. 2, 2001

(54) ADHESIVE AND COATING COMPOSITION FOR USE IN AN AQUEOUS ENVIRONMENT

(75) Inventors: John H. Williams, Flagstaff, AZ (US); Leonard Fahrer, Somerset, NJ (US)

(73) Assignee: Union Laboratories, Inc., Flagstaff, AZ (US)

(*) Notice: Subject to any disclaimer, the term of this patent is extended or adjusted under 35 U.S.C. 154(b) by 0 days.

(21) Appl. No.: 09/158,528

(22) Filed: Sep. 22, 1998

(51) Int. Cl.[7] .................................................. B32B 35/00
(52) U.S. Cl. ........................ 156/94; 156/331.6; 206/582; 524/292; 524/360
(58) Field of Search ........................... 524/292, 360; 206/582; 156/331.6, 94

(56) References Cited

U.S. PATENT DOCUMENTS

| | | |
|---|---|---|
| 1,068,691 | 7/1913 | Moomy . |
| 2,456,454 * | 12/1948 | Signer ................................. 524/360 |
| 2,459,739 * | 1/1949 | Groten et al. ..................... 156/331.6 |
| 2,553,124 | 5/1951 | Williams . |
| 2,596,179 | 5/1952 | Seymour . |
| 2,681,877 | 6/1954 | Seymour . |
| 3,131,104 * | 4/1964 | Korn ..................................... 156/87 |
| 3,485,712 | 12/1969 | Rehm . |
| 3,682,179 * | 8/1972 | Firth et al. ........................... 206/582 |
| 3,730,247 | 5/1973 | White . |
| 3,772,114 * | 11/1973 | Kowalchuk .............................. 156/94 |
| 3,975,558 | 8/1976 | Speer . |
| 3,985,598 * | 10/1976 | Trenda et al. .......................... 156/94 |
| 4,143,767 | 3/1979 | MacDonald . |
| 4,743,468 | 5/1988 | Jimenez . |
| 5,401,152 * | 3/1995 | Jacino et al. .......................... 156/94 |
| 5,447,006 | 9/1995 | Zenor . |
| 5,554,218 | 9/1996 | Evans et al. . |
| 5,569,346 * | 10/1996 | Marshall ............................... 156/94 |

FOREIGN PATENT DOCUMENTS

610345 * 10/1948 (GB) ................................ 156/331.6

* cited by examiner

Primary Examiner—John J. Gallagher
(74) Attorney, Agent, or Firm—Jacobson Holman, PLLC

(57) ABSTRACT

An adhesive and coating composition which is suitable for use in an aqueous environment is provided and which comprises a resin-plasticizer modified acrylonitrile-butadiene elastomer, dissolved in low-toxicity solvent. A method for repairing plastic sheet materials, particularly plastic sheet materials such as polyethylene (LDPE, MDPE), polypropylene (PP), polyvinyl chloride (PVC) and polyvinylidene chloride (PVDC), using the adhesive and coating composition wherein certain controls are effected is also provided. Such an adhesive composition provides a fast and extremely effective means for repairing perforations and tears in plastic sheet materials, is long lasting, safe and does not discolor over time.

29 Claims, 1 Drawing Sheet

ADHESIVE AND COATING COMPOSITION FOR USE IN AN AQUEOUS ENVIRONMENT

The present invention is directed toward an adhesive and coating composition which is suitable for use in an aqueous environment and which comprises a resin and plasticizer modified acrylonitrile-butadiene elastomer, dissolved in low toxicity solvents. The present invention is also directed to a method for repairing plastic sheet materials, particularly plastic sheet materials such as polyethylene (LDPE or MDPE), polypropylene (PP), polyvinyl chloride (PVC) and polyvinylidene di-chloride (PVDC), using the adhesive and coating composition.

BACKGROUND OF THE INVENTION

Repairing plastic surface or sheet materials using adhesive tapes, patches and coatings are well known in the art. However, such known adhesive tapes etc. are often unsuitable for underwater application, and typically do not have sufficient resistence to an aqueous environment to provide adhesion for extended periods of time. Furthermore, when applying such adhesive tapes etc. to the region or site of repair it is often necessary to evacuate the aqueous environment until the repair process has been completed. This is both time consuming and wasteful.

There is currently a known adhesive tape which is made from a thin (about 1/1000 th of an inch thick) polyvinylfluoride film having the trade name, TEDLAR™ (a product of Du Pont). The tape has an adhesive composition on one side made from a resin-plasticizer modified acrylonitrile-butadiene co-polymer. The adhesive composition used on this tape is a low tack, toluene-based, adhesive, having a slow drying time. This makes it less desirable for underwater application. The adhesive composition used is also extremely toxic and discolors or yellows with time, making it aesthetically displeasing. As with all adhesive tapes, the size of the patch is limited to the size of the tape. This places a limitation on repairs of different dimensions.

It has been found that an adhesive composition according to the present invention comprising a resin and plasticizer modified acrylonitrile-butadiene co-polymer, in liquid form, when applied to a patch material and allowed to dry in air for approximately 5–8 minutes prior to being pressed onto the site of repair, provides a superior means of repairing plastic sheet materials, particularly in an aqueous or underwater environment. Such an adhesive may also be applied directly to the surface of the plastic sheet material, at the repair region or site, as a coating.

It is therefore an object of the present invention to provide an adhesive or coating composition, hereinafter referred to as "an adhesive composition", which overcomes one or more of the above-mentioned shortcomings of known adhesives and which provides a more aggressive and/or longer lasting adherence of a material patch compared to the known adhesive tape and/or provides an adhesive which is especially suited for underwater application. It is also an object of the present invention to provide an adhesive composition, in liquid form, which can be applied to a variety of material patches, for compatibly repairing various plastic sheet materials in an aqueous environment.

SUMMARY OF THE INVENTION

In accordance with one aspect of the present invention, an adhesive composition is provided especially for use in underwater applications, which composition comprises a resin and plasticizer modified acrylonitrile-butadiene elastomer and low toxicity solvents, wherein the adhesive composition is in liquid form.

In accordance with a second aspect of the present invention, a kit for repairing plastic sheet materials is provided, which comprises an adhesive composition, in liquid form, and a material patch. The adhesive composition comprises a resin-plasticizer modified acrylonitrile-butadiene elastomer and a low toxicity solvent and is especially suited for underwater applications.

As a third aspect of the present invention, a method for repairing plastic sheet materials is provided, which method is especially suited for underwater applications and comprises applying an adhesive composition, in a liquid form, to a material patch; allowing the adhesive composition to dry for between approximately 5 to 8 minutes or until it is tacky to touch; placing the material patch with the applied adhesive over the region of the plastic sheet material being repaired; and applying pressure to the material patch so as to adhere the material patch onto the region being repaired.

In a fourth aspect of the present invention, a method for preparing a solvent based adhesive is provided which method comprises dissolving an acrylonitrile-butadiene elastomer in low toxicity solvents, to produce a solution; adding a resin and a plasticizer to the solution and subsequently blending the solution so as to produce a resin-plasticizer modified acrylonitrile-butadiene elastomer adhesive composition, in a liquid form, especially suited for underwater applications.

DESCRIPTION OF PREFERRED EMBODIMENTS

Figure 1:
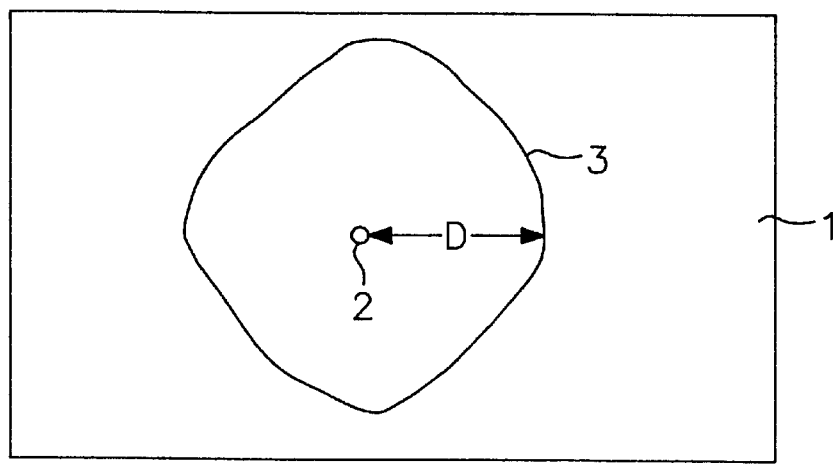
FIG. 1 is a diagrammatic view showing application of an adhesive composition as a coating for repair of plastic sheet materials.

An adhesive composition which comprises a resin-plasticizer modified acrylonitrile-butadiene copolymer, dissolved in a low toxicity solvent is provided, in liquid form. Such an adhesive composition is advantageously used in underwater applications for repairing plastic sheet materials such as, polyethylene, preferably low density polyethylene (LDPE) and medium density polyethylene (MDPE), polypropylene (PP), polyvinyl chloride (PVC) and polyvinylidene di-chloride (PVDC). Examples of articles or products made from such plastic sheet materials which may be repaired in accordance with the present invention include, but are not limited to, swimming pool liners, covers, flotation devices, inflatables and the like.

Although other thermoplastic resins and plasticizers typically used in adhesive and coating compositions could be used and are discussed below, an especially effective adhesive composition is provided when the resin is a terpene phenolic of the alpha-pinene phenol type and the plasticizer is a dibenzoate of the aromatic ester type. Preferably the terpene phenolic resin has a ring and ball softening point from 95–135° C. Preferably the dibenzoate has a molecular weight of between 250–350 and has a generic formula as follows:

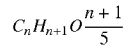

$$C_nH_{n+1}O\frac{n+1}{5}$$

Examples of other resins include, but are not limited to, Zonarez polyterpene resins having a ring and ball softening point range between 85–135° C.; Zonatec modified terpenes, having a ring and ball softening point range between 89–115° C.; Sylvatec rosin esters having a ring and ball softening point range between 85–139° C. and Sta-Tac C 5 hydrocarbon tackifiers having a ring and ball softening point range between 100–102° C.

Examples of other plasticizers include, but are not limited to, aromatic esters such as Di- Propylene Glycol Dibenzoate (DPGDB) and Di-Ethylene Glycol Dibenzoate (DEGDB); aromatic diesters such as Di-Butyl phthalate (DBP), Di-Octyl Phthalate (DOP), Di-2-Ethlyhexyl Phthalate (DEHP), Di-Ethyl Phthalate (DEP), Di-Isodecyl Phthalate (DIDP) and Butyl Benzyl Phthalate (BBP); aliphatic diesters such as Di-Octyl Adipate (DOA), Di-Isooctyl Adipate (DIOA) and Di-Isodecyl Adipate (DIDP); and epoxidized soya oil.

An especially effective adhesive is provided when the acrylonitrile-butadiene co-polymer has an acrylonitrile content of between 15–45% by weight of the co-polymer. Examples of such acrylonitrile-butadiene copolymers include, but are not limited to, PARACRIL CV and PARACRIL CV80, which both have an acrylonitrile content of 35.2%, and CHEMIGUM N612B and CHEMIGUM N615B, which both have an acrylonitrile content of 33.4%. The preferred amount of acrylonitrile-butadiene co-polymer is an amount between 1–22% by weight of the total adhesive composition. Most preferably between 10–15% by weight of the total composition.

The preferred amount of resin in the adhesive composition is between 1–22% by weight of the total composition. Most preferably between 10–15% by weight of the total composition. The amount of plasticizer is preferably between 1–15% by weight of the total composition. Most preferably the amount of plasticizer is between 2–5% by weight of the total composition.

The solvent is a solvent having low toxicity, which is an important issue for consumer well being. Although any solvents of low toxicity may be used for the adhesive and coating compositions, an especially effective adhesive composition is provided when the solvent is selected from the group consisting of cyclohexanone, ethyl acetate (99%) and mixtures of cyclohexanone and ethyl acetate (99%).

Examples of other solvents include, but are not limited to, n-butanol, isopropanol, isobutanol, 2,2, methylcyclohexanone, 2-pentanone, heptane, isoamyl alcohol and ethyl acetoacetate. These may be combined by adding a ketone(-one) with heptane and an alcohol (-ol) in the same formulation.

Preferably the amount of solvent in the adhesive composition is between 53–93% by weight of the total composition. Most preferably, when the solvent is a mixture of cyclohexanone and ethyl acetate (99%) the ratio thereof is 1:1.

Other ingredients typically used in adhesives can be added to the adhesive composition. It is preferred that an optical brightener is added to provide a more pleasing appearance. Such an optical brightener is preferably a type of chemical fluorescent such as UVITEX OB (2,2'-(2,5-Thiophenediyl)bis[5-tert-butylbenzoxazole], having the formula $C_{26}H_{26}N_2O_2S$). It is also preferred that an antioxidant be added. An especially favorable antioxidant is Butyl Zimate (zinc dibutyldithiocarbamate). Preferably the antioxidant does not cause discoloration and/or yellowing with time and does not stain.

In order to obtain a maximum sealing effect using the adhesive or coating composition of the present invention, certain controls must be exercised. Particularly, the length of drying time is very important. When used alone as a coating in sealing pinhole perforations, the coating should be allowed to dry in air for 8 hours before returning the plastic sheet material to the aqueous environment in which it is used, thus guaranteeing adhesion and allowing the coating to flow and fill the perforation. When coated onto a material patch which is made from a thin flexible film of plastic sheet materials, especially polyvinyl chloride, the adhesive should be allowed 5 to 8 minutes drying time or until it is tacky to the touch. Then, when applied to the region of repair and pressed or rolled flat to exclude any existing air bubbles, maximum sealing of the torn or perforated region or area is provided.

For underwater applications, the adhesive composition should be applied in air to the thin, flexible polyvinyl chloride patch material, allowed to dry for 5 to 8 minutes or until it is tacky to the touch, then moved underwater to the site or region of the tear. As with non-water applications, the patch is then applied to the area being repaired and pressed or rolled flat to exclude any existing air bubbles.

Another important control which should be used to obtain a maximum sealing effect is to shape and size the patch material so that it extends about one inch in each direction from the torn or perforated region being repaired.

Use of the adhesive or coating composition can best be illustrated by reference to the figures showing general applications of the adhesive or coating composition. In FIG. 1, a perforation 2 caused by use or abuse of the plastic sheet material 1 may be sealed by application of the adhesive composition as a coating 3. For this type of application the adhesive is brushed over the surface of the sheet materials at the site or region of the perforation and beyond the perforation by 1 inch (D) in each direction. This coating is then allowed to dry by evaporation so that the coating makes a firm yet flexible coating over the perforation creating a seal and a bond with the plastic sheet material, thereby prolonging the life of the plastic sheet material.

Figure 2:
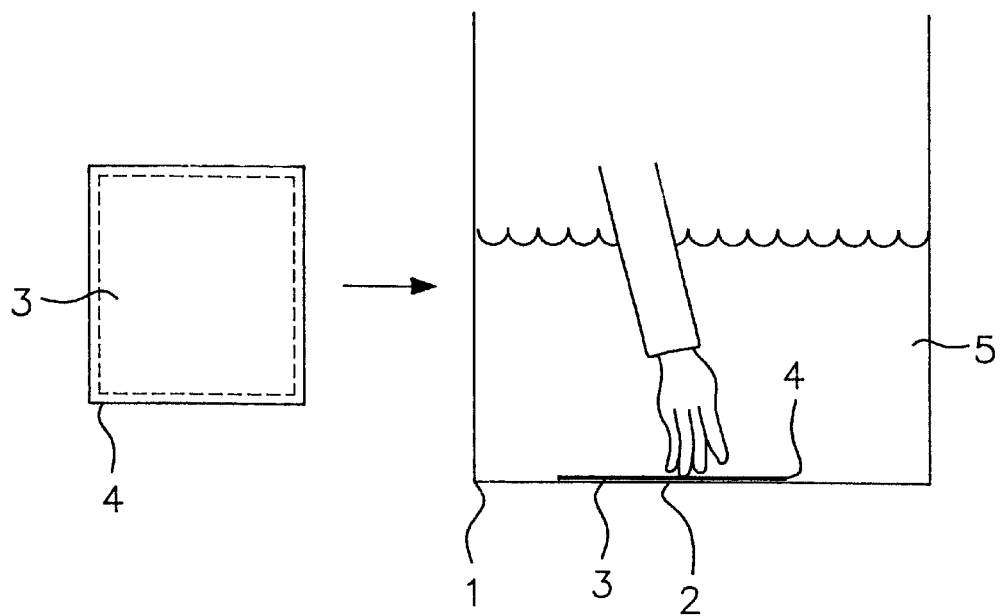
FIG. 2 is a schematic view showing application of an adhesive composition to a patch material for repair of plastic sheet materials.

FIG. 2 shows the use of the adhesive or coating 3, in an underwater application, in combination with a patch material 4. As a first step, the adhesive 3 is applied by brushing onto a thin, flexible patch material 4 made from polyvinyl chloride film and allowed to dry in air for 5 to 8 minutes or until the adhesive coating is tacky to the touch. The second step involves applying the adhesive coated polyvinyl chloride patch material prepared in step 1 to the tear or perforated region 2, underwater (5). This type of underwater application enables the simple and effective repair of plastic sheet materials where it is impractical, or not economically feasible, to evacuate the aqueous environment in which the sheet materials reside, for example, a swimming pool liner. In situations where it is not necessary to apply the patch material in an aqueous environment, the patch is simply applied to the region being repaired, in the same manner. It is not necessary to keep the repaired article out of its aqueous environment for any period of time to assure a proper sealing effect.

Current adhesives or coatings tend to fail in this type of application due to the ingredients in those compositions that do not have sufficient resistance to a water environment to provide adhesion over a long period of time. These materials tend to adsorb or absorb water, swell, soften, and eventually fail adhesively from the surface to which they are bonded.

The term "underwater application", as used herein, essentially means application in an aqueous environment. In other words applying the adhesive composition to a suitable surface either as a coating or as a layer on a material patch, in the presence of water or the like.

The term "low toxicity," as it relates to the solvents used in the adhesive composition of the present invention, means not as toxic as toluene. Toxicity data for the solvents of the present. invention can be found in the Materials Safety Data Sheets, and which are incorporated herein by reference. NIOSH registry number GW1050000 provides toxicity data for cyclohexanone, published in *Manual of Analytical Methods* 11, Vol. 2; S19. Similarly. NIOSH registry number AH 5425000 provides toxity data for ethyl acetate (CAS #141-78-6).

EXAMPLE 1

An adhesive or coating formulation is prepared as follows: 100 parts of acrylonitrile-butadiene co-polymer (NIPOL 1022™ manufactured by Zeon Chemical Corporation) was dissolved in a solvent composition comprised of 50% Cyclohexanone and 50% Ethyl Acetate (99%), by weight, both considered to be solvents of low toxicity, in normal use. To this solution 100 parts of a terpene phenol resin (NIREZ V20401™ manufactured by Arizona Chemical Corporation) is added, 32 parts of a dibenzoate plasticizer (BENZOFLEX S312™ manufactured by Velsicol Corporation or UNIPLEX-512™ manufactured by Unitex Chemical) and 1 to 3 parts of a zinc dibutyldithiocarbamate, antioxidant (Butyl Zimate manufactured by R.T. Vanderbilt Co., Inc.). UVITEX OB (manufactured by Ciba Additives, Ciba Specialty Chemical Corp.) is added as an optical brightener. The solution is used in a range of 25 to 35% solids for the best application (brushing) viscosity.

EXAMPLE 2

An adhesive composition prepared in accordance with Example 1 is set forth as follows:

| Materials | Weight (Grams) |
|---|---|
| Ethyl Acetate | 36.39 |
| Cyclohexanone | 36.39 |
| NIPOL 1022 | 11.48 |
| NIREZ V2040 | 11.48 |
| BENZOFLEX S312 | 3.63 |
| Butyl Zimate | 0.32 |
| UVITEX OB | 0.31 |

EXAMPLE 3

An adhesive composition is prepared in accordance with Example 1, except that the resin is replaced with a Zonarez polyterpene resin and the plasticizer is replaced with Di-Propylene Glycol Di Benzoate (DPGDB), in the same amounts.

EXAMPLE 4

An adhesive composition is prepared in accordance with Example 1, except that the resin is replaced with a Zonatac modified terpene and the plasticizer is replaced with Di-Ethylene Glycol Di Benzoate (DEGDB), in the same amounts.

EXAMPLE 5

An adhesive composition is prepared in accordance with Example 1, except that the resin is replaced with a Sylvatac rosin ester and the plasticizer is replaced with Di Butyl Phthalate (DBP), in the same amounts.

What is claimed is:

1. An adhesive composition especially suited for underwater application and comprising:

a thermoplastic resin and plasticizer modified acrylonitrile-butadiene elastomer wherein the acrylonitrile-butadiene elastomer is in an amount between 1–22% by weight of the total adhesive composition, wherein the resin is a terpene phenolic resin in an amount between 1–22% by weight of the total composition and the plasticizer is in an amount between 1–15% by weight of the total composition;

and a low-toxicity solvent.

2. The composition of claim 1, wherein the composition is in liquid form.

3. The composition of claim 1, wherein acrylonitrile-butadiene elastomer is a co-polymer having an acrylonitrile content of approximately between 15–45% by weight of the co-polymer.

4. The composition of claim 1, wherein the plasticizer is a dibenzoate.

5. The composition of claim 1, wherein the solvent is selected from the group consisting of cyclohexanone, ethyl acetate and mixtures thereof.

6. The composition of claim 5, wherein the solvent is the mixture of cyclohexanone and ethyl acetate, in a 1:1 ratio.

7. The composition of claim 1, wherein the amount of solvent is between 53–93% by weight of the total composition.

8. The composition of claim 1, wherein the solvent is a mixture of cyclohexanone in an amount between 26.5–46.5% by weight of the total composition and ethyl acetate in an amount between 26.5–46.5% by weight of the total composition.

9. The composition of claim 1, further comprising an optical brightener.

10. The composition of claim 1, wherein the plasticizer is a dibenzoate, and the solvent is a mixture of ethyl acetate and cyclochexanone in a ratio of 1:1.

11. A kit for repairing plastic sheet materials used in an aqueous environment comprising:

a composition of claim 1; and a material patch.

12. The kit of claim 11, wherein the material patch is made from a thin polyvinyl chloride film.

13. The kit of claim 12, wherein the adhesive is formulated to bond to plastic sheet material selected from the group consisting of polyethylene, polypropylene, polyvinyl chloride and polyvinylidene di-chloride.

14. The kit of claim 11, further comprising an adhesive applicator.

15. A method for repairing a region of a plastic sheet material comprising:

coating the adhesive composition of claim 1 onto a material patch;

allowing the adhesive composition to dry for between approximately 5 to 8 minutes or until it is tacky to touch;

placing the adhesive coated material patch over the region of the plastic sheet material being repaired; and applying pressure to the coated material patch so as to adhere the patch onto the region being repaired.

16. The method of claim 15, wherein pressing of the material patch removes any air bubbles which are trapped between the material patch and the plastic sheet material being repaired.

17. The method of claim 15, further comprising sizing the material patch so that the material patch covers the region of the plastic sheet material being repaired and extends beyond the region by at least 1 inch in any direction.

18. The method of claim 15, wherein the material patch is made from polyvinyl chloride.

19. The method of claim 15, wherein the plastic sheet materials being repaired is selected from the group consisting of polyethylene, polypropylene, polyvinyl chloride and polyvinylidene di-chloride.

20. The method of claim 15, wherein the material patch is placed over and pressed onto the region being repaired in an aqueous environment.

21. A method for preparing a solvent based adhesive comprising:

dissolving an acrylonitrile-butadiene copolymer having an acrylonitrile content of between approximately 15–45%, in a low-toxicity solvent, to produce a solution;

adding a thermoplastic terpene phenolic resin and a plasticizer to the solution; and subsequently blending so as to produce a solvent based adhesive composition containing a resin and plasticizer modified acrylonitrile-butadiene copolymer; wherein the adhesive composition bonds and seals plastic sheet materials in underwater applications.

22. The method of claim 21, wherein the acrylonitrile-butadiene copolymer is in an amount between 1–22% by weight of the total composition.

23. The method of claim 21, wherein the resin is in an amount between 1–22% by weight of the total composition.

24. The method of claim 21, wherein the plasticizer is a dibenzoate plasticizer in an amount between 1–15% by weight of the total composition.

25. The method of claim 21, wherein the solvent is selected from the group consisting of cyclohexanone, ethyl acetate and mixtures thereof.

26. The method of claim 21, wherein the amount of solvent is between 53–93% by weight of the total composition.

27. The method of claim 21, wherein the solvent is a mixture of cyclohexanone in an amount between 26.5–46.5% by weight of the total composition and ethyl acetate in an amount between 26.5–46.5% by weight of the total composition.

28. An adhesive composition especially suited for underwater application and consisting essentially of a simple admixture of a solvent solution of an acrylonitrile-butadiene elastomer, a terpene phenolic resin and a plasticizer, wherein the acrylonitrile-butadiene elastomer is in an amount between 1–22% by weight of the total adhesive composition, the resin is in an amount between 1–22% by weight of the total composition and the plasticizer is in an amount between 1–15% by weight of the total composition, and the solvent is a low-toxicity solvent.

29. A method for repairing a region of a plastic sheet material while the plastic sheet material is submerged in water and comprising:

coating the adhesive composition of claim 1 onto a material patch;

allowing the adhesive composition to dry for between approximately 5 to 8 minutes or until it is tacky to touch;

placing the adhesive coated material patch over the region of the plastic sheet material being repaired; and applying pressure to the coated material patch so as to adhere the patch onto the region being repaired.

* * * * *